United States Patent [19]
Mathis et al.

[11] Patent Number: 5,444,854
[45] Date of Patent: Aug. 22, 1995

[54] INPUT/OUTPUT INITIATE COMMAND MECHANISM

[75] Inventors: Joseph R. Mathis, Georgetown, Tex.; Richard R. Oehler, Somers, N.Y.; Carl Zeitler, Jr., Austin, Tex.

[73] Assignee: International Business Machines Corporation, Armonk, N.Y.

[21] Appl. No.: 849,643

[22] Filed: Mar. 6, 1992

Related U.S. Application Data

[63] Continuation of Ser. No. 675,118, Mar. 25, 1991, abandoned, which is a continuation of Ser. No. 297,780, Jan. 13, 1989, abandoned.

[51] Int. Cl.⁶ .............................................. G06F 13/00
[52] U.S. Cl. ................................... 395/825; 395/325; 395/839; 364/DIG. 1; 364/228; 364/228.4; 364/228.5; 364/229; 364/230; 364/230.3; 364/232.1; 364/238.3; 364/238.5; 364/238.6; 364/238.7; 364/240.8; 364/242.94; 364/260; 364/260.1; 364/262; 364/262.1
[58] Field of Search ................. 370/60, 74.1; 395/325, 395/275

[56] References Cited

U.S. PATENT DOCUMENTS

| | | | |
|---|---|---|---|
| 3,488,633 | 1/1970 | King et al. | 340/172.5 |
| 3,833,930 | 9/1974 | Macker | 340/172.5 |
| 4,514,823 | 4/1985 | Mendelson et al. | 364/900 |
| 4,593,375 | 6/1986 | Gershenson | 364/900 |
| 4,604,693 | 8/1986 | Chadima, Jr. et al. | 364/200 |
| 4,631,666 | 12/1986 | Harris et al. | 364/200 |
| 4,751,634 | 6/1988 | Burrus, Jr. et al. | 364/200 |
| 4,783,734 | 11/1988 | May et al. | 364/200 |
| 4,807,109 | 2/1989 | Farrell et al. | 364/200 |
| 4,807,116 | 2/1989 | Katzman et al. | 364/200 |
| 4,821,174 | 4/1989 | Webb et al. | 364/200 |
| 4,876,664 | 10/1989 | Bittorf et al. | 364/900 |
| 4,885,684 | 12/1989 | Lilja et al. | 364/200 |
| 4,888,684 | 12/1989 | Lilja et al. | 364/200 |
| 4,958,271 | 9/1990 | Yoshida et al. | 364/200 |

FOREIGN PATENT DOCUMENTS 6020258  1/1985  Japan ........................... G06F 13/12

OTHER PUBLICATIONS

*IBM Technical Disclosure Bulletin*, vol. 15, No. 4, pp. 1232-1233, Sep. 1972, entitled "Channel Initiated Subsystem Diagnostics" by O. E. Salmassy and T. L. Wimer.

*IBM Technical Disclosure Bulletin*, vol. 30, No. 11, pp. 28-31, Apr. 1988, entitled "SPD I/O Bus operations Testing Protocol" by R. S. Calvert, H. J. Crook and C. N. McKinney.

*Primary Examiner*—Allen R. MacDonald
*Assistant Examiner*—Tariq Hafiz
*Attorney, Agent, or Firm*—Thomas E. Tyson

[57] ABSTRACT

A data processing system including a processor that issues communications commands on a first communications channel and a peripheral device that is connected to the first communications channel and to a second communications channel that operates asynchronously relative to the first communications channel. The peripheral device performs communications operations specified from the commands from the processor and further responds to communications over the second communications channel. The peripheral device includes a controller that provides a status word to the processor in response to the command issued to the peripheral device. The status word indicates the status condition of the peripheral device at the time when the peripheral device initiates the operation specified by the issued command.

6 Claims, 3 Drawing Sheets

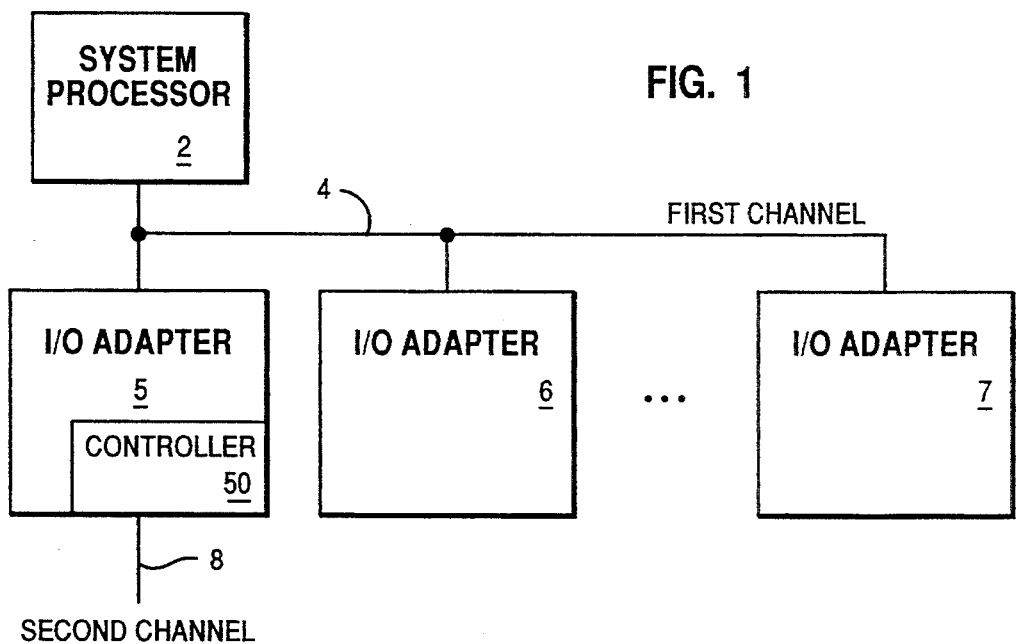
FIG. 1
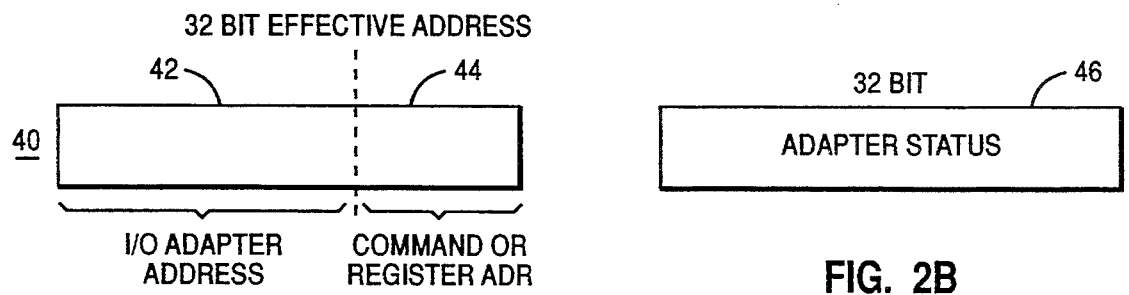
FIG. 2A
FIG. 2B
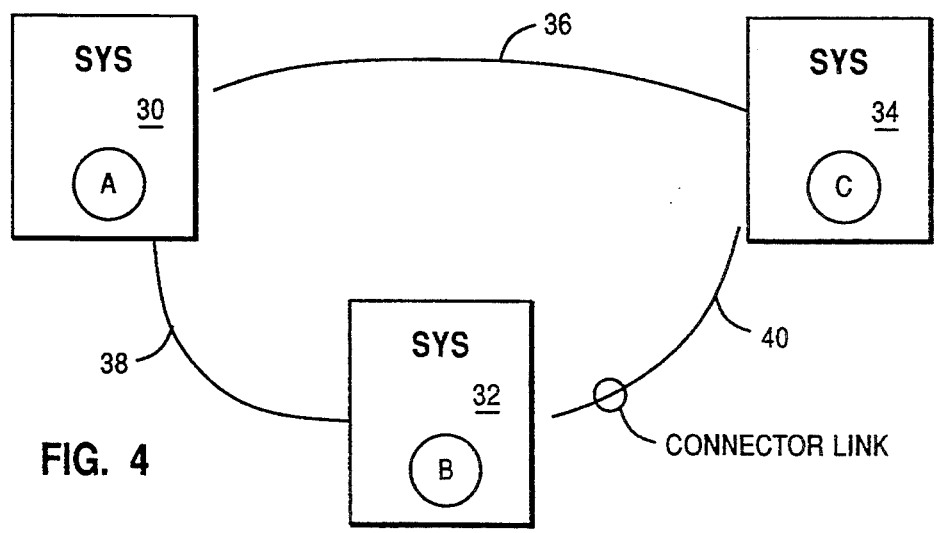
FIG. 4

INPUT/OUTPUT INITIATE COMMAND MECHANISM

This is a continuation of application Ser. No. 07/675,118 filed Mar. 25, 1991, now abandoned which is a continuation of application Ser. No. 07/297,780 filed Jan. 13, 1989 now abandoned.

RELATED APPLICATIONS

This patent application is related to U.S. patent application, Ser. No. 07/297,776 filed Jan. 13, 1989 entitled "System and Method for Data Communications" and U.S. patent application, Ser. No. 07/297,777 filed Jan. 13, 1989 entitled "Transfer Direction Turnaround in Network Data Communications" which are both herein incorporated by reference.

FIELD OF THE INVENTION

This invention relates to data processing systems and more specifically to input/output device communications within a data processing system.

BACKGROUND ART

In the control of input/output devices, a program software will issue commands that will initiate requested actions in the input/output device or adapter. The command may be a request to start, stop or cancel some action or event. The start command, for example, may be an explicit start command or an implied start through the loading of a value into a device register.

When a command is issued, the program software does not always know exactly the state of the input/output device. It can read status to determine the device state. However, if external asynchronous events can alter the state of the input/output device, then the status may simply reflect the state only at the instance the status was sent. It does not indicate that the state at a future point in time when the command is to be issued. Thus, there exists some uncertainty of the device when the command is issued.

One way to circumvent the problem of uncertainty is to design the input/output device adapter to include intelligence having the capability to determine if current conditions permit the acceptance and execution of the specific command that is issued. This determination and start of execution must occur at a single atomic point in time. The problem now is to determine if the command was accepted and execution started or was the command rejected and the operation aborted. Reading status in a subsequent operation will tell the state at that point in time, but will be at some later point in the operation of the system.

This problem was previously addressed in the IBM System 360 using an architecture providing a feedback in the form of condition codes to inform the software of the success or failure of a StartI/O command. The condition codes reflected the state of the adapter following issuing of the command. The condition codes were then generated by the communications channel and did not reflect the action taken by the actual input/output device.

The IBM System 370-XA architecture defined another command "StoreSubchannel and TestSubchannel". These commands read subchannel status and placed the status in main storage. The TestSubchannel command also reset the subchannel in any pending interrupts. However, neither command initiated an operation or transaction within the channel.

In most systems today the software program executing in the system processor has a very tight coupling with the input/output adapter. In general, the input/output adapters are mapped into the memory address space of the processor (i.e., memory mapped I/O). Thus the LOAD and STORE instruction are used to reference both memory and the I/O adapters. The affective address generated by the execution of the LOAD and STORE instruction determines what facility is referenced (memory, or which adapter or even which register within the adapter). When the LOAD or STORE instruction is directed to an I/O adapter, data is transferred between the general purpose registers of the processor and the selected registers with the adapter. This form of I/O control is generally called Program I/O or PIO.

IBM *Technical Disclosure Bulletin*, Vol. 15, No. 4, September, 1972, pages 1232-33, entitled "Channel Initiated Subsystem Diagnostics" discloses a typical and traditional method of dispatching channel commands. In this disclosure diagnostic test commands are dispatched over a channel and at the end of the designated test, a status is provided.

IBM *Technical Disclosure Bulletin*, Vol. 30, No. 11, April, 1988, pages 28-31, entitled "SPD I/O Bus Operation Testing Protocol" also discloses a protocol for initiating tests. After a bus operation request message is sent and bus operation function block is read, a status will be returned to the host processor providing an initial status of the device to be tested.

SUMMARY OF THE INVENTION

In accordance with the present invention a data processing system is provided that includes a processor that issues communication commands on a first communications channel. A peripheral device is connected to the first communications channel and to a second communications channel that operates asynchronously. The peripheral device performs communications operations that are specified by the commands from the processor and also responds to communications with other devices over the second communications channel. The peripheral device includes a controller that provides a status word to the processor in response to a command being issued to the peripheral device. The status word indicates a status condition of the peripheral device at the time when the peripheral device initiates an operation specified by the issued command.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

FIG. 1 is block diagram illustrating a system processor connected to several I/O adapters;

FIG. 2a is a diagram illustrating the contents of a I/O initiation command;

FIG. 2b is a diagram illustrating the data provided in response to an I/O initiation command;

FIG. 4 is a block diagram illustrating the network structure where each network includes a processor and an I/O adapter, the I/O adapters interconnecting the other systems through a communication link;

BEST MODE FOR CARRYING OUT THE INVENTION

Figure 3:
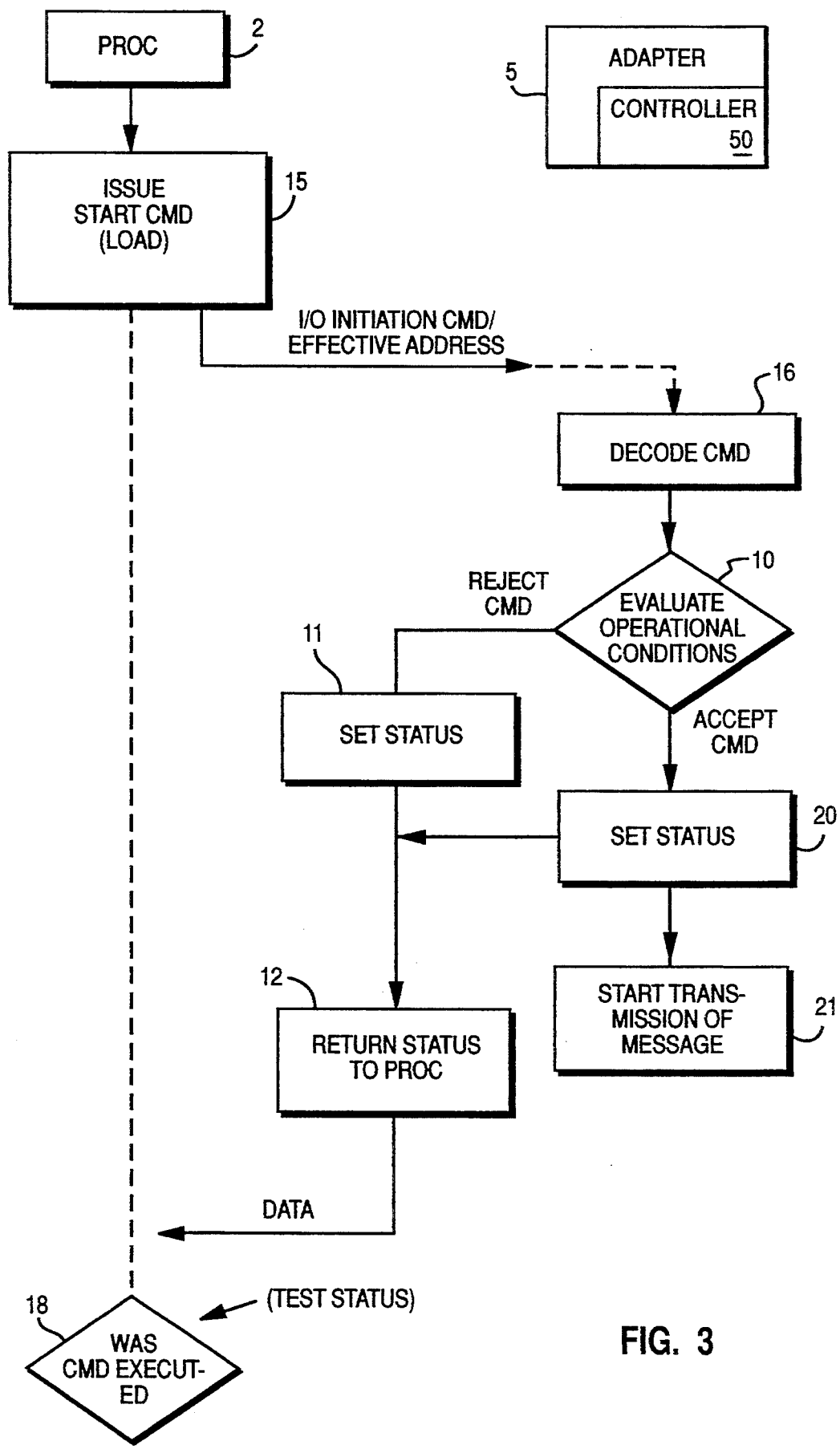
FIG. 3 is a diagram illustrating the information flow between a processor and an adapter during the transmission of the I/O initiation command.

This invention provides a mechanism for communicating with an external peripheral that is in turn communicating with devices in asynchronous manner. FIG. 1 is a block diagram illustrating a system processor 2 that is connected through a first communication channel 4 to several I/O adapters 5, 6 and 7. The I/O adapters 5, 6 and 7 may in turn be connected to a communication link (or a second communication channel) 8 to other devices.

FIG. 2a is a diagram illustrating the format of the I/O initiation command 40. To the system processor, this commands operates as if it is a LOAD command with an effective address. The effective address is a 32 bit address 42 that contains an I/O adapter address in a first portion and in a second portion a command 44 or register designation within the I/O device. When this I/O initiation command is provided on the communications bus 4 to an I/O adapter (such as 5) the I/O adapter returns data in the format illustrated in FIG. 2b which contains the adapter status. The adapter status in the preferred embodiment contains such information as the current channel state, if the command that was received was rejected, any pending error conditions and any conditions representing the operational status of the second channel.

FIG. 3 is a flow diagram illustrating the operation of the processor 2 and an adapter 5 controller 50 through the issuance of the I/O initiation command. The processor 2 executes a LOAD command which with its effective address operates as the I/O initiation command. This is issued across the communications channel 4 to the I/O adapter 5 controller 50. Upon receiving this command, the I/O adapter 5 controller 50 decodes the command in step 16. In step 10 the I/O adapter evaluates the operational conditions of the adapter 5 controller 50 at that time and either rejects the command and sets status accordingly in step 11 or accepts the command and sets the status accordingly in step 20. If the command has been rejected the adapter 5 controller 50 returns the status to the processor in step 12. If the command is accepted, the adapter 5 controller 50 returns the status to the processor in step 12 and simultaneously starts the transmission of the message in accordance with the command in step 21. Upon receiving the status over the communications channel 4, processor 2 then proceeds to step 18 to determine from the status information if the command was executed.

FIG. 4 is block diagram simply illustrating the network structure containing three systems 30, 32 and 34 that are interconnected with communications links 36, 38 and 40. Each system such as system 30 includes a processor such as processor 2, an communications channel 4 and at least one I/O adapter such as 5. The I/O adapter provides the communications over the communications links such as 36, 38 and 40.

Figure 5:
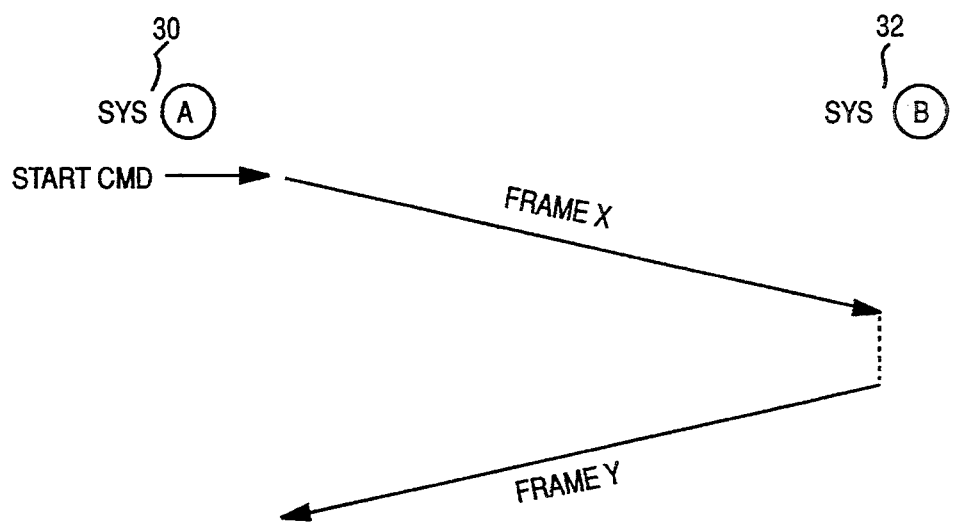
FIG. 5 is a diagram illustrating a network data exchange flow for a normal exchange.

FIG. 5 is a network data exchange flow diagram illustrating such a communications over the communications link. In FIG. 5 a command is received from System A 30 which provides a Frame X to a System B 32. In response to receiving Frame X System B 32 provides Frame Y back to System A 30. In this example the I/O initiation command initiated the transfer of Frame X.

Figure 6:
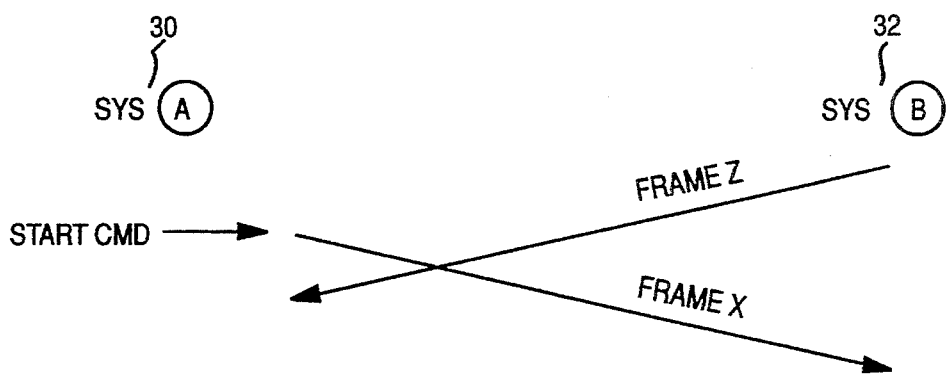
FIG. 6 is a diagram illustrating a network data exchange flow for an abnormal exchange where two systems are attempting to communicate at the same time.

FIG. 6 illustrates an abnormal network data exchange when the I/O initiation command is provided to the System A 30 I/O adapter resulting the Frame X being transmitted. In this example the I/O adapter after receiving the I/O initiation command returns a status indicating that the I/O initiation command has been accepted and that Frame X is starting to be transmitted. In this example the expected Frame Y in response to Frame X will not be transmitted by System B 32 because System B 32 initiated transfer of Frame Z in response to an I/O command from its processor. System A 30 detects Frame Z and not the expected Frame Y and may, for example, abort the operation.

Figure 7:
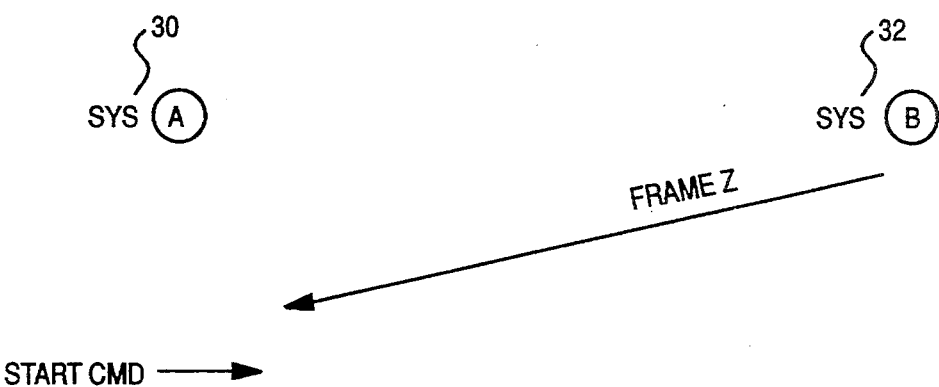
FIG. 7 is a diagram illustrating a network data change flow when the system I/O adapter receives the I/O initiation command after receiving a communications on the channel link.

FIG. 7 illustrates a network data exchange flow where a Frame Z has been transmitted by System B 32 to System A 30. Under normal circumstances the I/O adapter in System A 30 will respond with a frame back to System B 32. However in this instance a start command is received right at the completion of the Frame Z transmission. Internally in the I/O adapter of System A 30, since the I/O adapter is expected to respond to the Frame Z transmission, the I/O initiation command will be rejected and the requested Frame X transmission will not be made. The status however returned by the I/O adapter will reflect the rejection of this claim.

It should be apparent to one skilled in the art that the chief advantage provided by the present invention is that the status information is provided quickly to the processor allowing the processor to quickly determine whether or not the start command is to be executed by the I/O adapter. This information is provided in a manner that prevents any possible confusion or uncertainty as to the state of the I/O adapter when the command has been received.

Although the invention has been described with reference to the specific embodiment, the description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments that may fall within the true scope of the invention.

We claim:

1. A data processing system comprising;
    a processor means connected only to a first communications channel for issuing a communications command on said first communications channel for communications on a second communications channel; and
    a peripheral means connected to said first communications channel and to the second communications channel operating asynchronously, said peripheral means for executing said command including control means for simultaneously providing a status word to said processor means in response to said command indicating that said peripheral means is executing said command on said second communications channel at the same time that said peripheral means is providing said status word.

2. A data processing system according to claim 1 wherein said processor means further receives said status word from said peripheral means for determining if said command is being performed by said peripheral means.

3. A data processing system according to claim 2 wherein said control means further provides an indication of said current operational state of said peripheral means and said second channel at said time when said command is executed.

4. A data processing system comprising:
a processor means connected only to a first communications channel for issuing a communications command on said first communications channel for communications on a second communications channel; and
a plurality of peripheral means each connected to said first communications channel and at least one of said peripheral means connected to the second communications channel wherein the second communications channel is operating asynchronously from the first communications channel, said one peripheral means for executing said command and including control means for simultaneously providing a status word to said processor means in response to said command indicating that said peripheral means is executing said command on said second communications channel at the same time that said peripheral means is providing said status word.

5. A data processing system according to claim 4 wherein said processor means further receives said status word from said peripheral means for determining if said command is being performed by said peripheral means.

6. A data processing system according to claim 5 wherein said control means further provides an indication of said current operational state of said peripheral means and said second channel at said time when said command is executed.

* * * * *

UNITED STATES PATENT AND TRADEMARK OFFICE
CERTIFICATE OF CORRECTION

PATENT NO. : 5,444,854
DATED : August 22, 1995
INVENTOR(S) : Joseph R. Mathis, Richard R. Oehler and Carl Zeitler, Jr.

It is certified that error appears in the above-indentified patent and that said Letters Patent is hereby corrected as shown below:

Col. 1, line 59, delete "StartI_O" and insert --Start_I_O--;
line 65, delete "StoreSubchannel" and insert
--Store_Subchannel--; and
lines 65-66, delete "TestSubchannel" and insert
--Test_Subchannel--.

Signed and Sealed this

Ninth Day of July, 1996

Attest:

BRUCE LEHMAN

Attesting Officer    Commissioner of Patents and Trademarks